Jan. 22, 1946.   R. W. BROWN   2,393,501
PIVOTAL JOINT
Filed Oct. 26, 1943
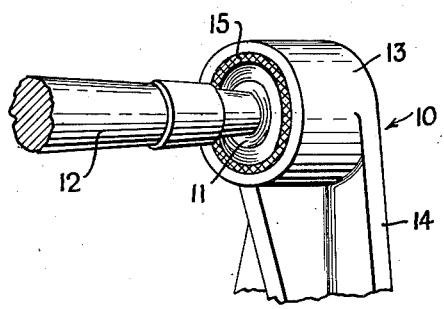
Fig.1.
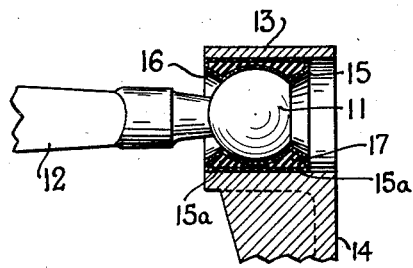 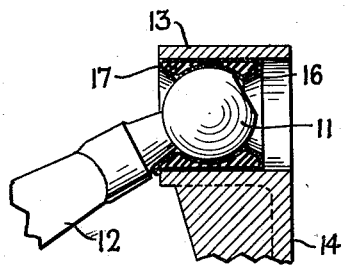
Fig.2.   Fig.3.
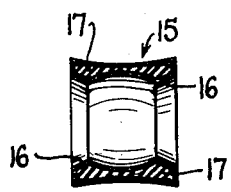
Fig.4.
Inventor
ROY W. BROWN
By Ely & Frye
Attorneys Patented Jan. 22, 1946

2,393,501

UNITED STATES PATENT OFFICE 2,393,501

PIVOTAL JOINT

Roy W. Brown, Akron, Ohio, assignor to The Firestone Tire & Rubber Company, Akron, Ohio, a corporation of Ohio Application October 26, 1943, Serial No. 507,739

6 Claims. (Cl. 287—90)

This invention relates to a pivotal joint and to to an elastic bushing used in forming the same, and more especially it relates to a joint adapted to enable relative oscillatory movement of the members coupled together thereby as well as relative reciprocatory movement therebetween.

Pivotal joints of the type that comprise this invention normally include a ball end shaft or rod which is received in a cylindrical housing or casing and positioned therein by an elastic bushing.

U. S. Patent No. 2,324,984, to the present inventor, describes pivotal joints closely related to that disclosed herein. However, the bushings and joints disclosed in said patent primarily are adapted to enable oscillatory movement of one member with relation to its companion member. Such patent also discloses a novel friction material which has lower static friction than kinetic friction, which material is used in the invention hereafter described.

An object of this invention is to provide an improved pivotal joint which has an appreciable area of contact around an oscillating or rotating ball and a large area of contact within a cylinder surrounding such ball and which connects such members so as to allow reciprocating movement therebetween.

A further object of the invention is to provide an improved, elastic bushing adapted to eliminate lost motion between pivotal members of the character mentioned.

Another object of the invention is to provide frictionless damping in a pivotal joint of the character mentioned.

Still another object of the invention is to provide an improved, inexpensive bushing adapted for use in a pivotal joint having oscillatory and reciprocating movement between the coupled members, which movement is frictionally resisted by such bushing.

Other objects of the invention will be readily apparent from the following description, when considered in connection with the accompanying drawing, of which:

Fig. 1 is a perspective view of a pivotal joint embodying the invention;

Figs. 2 and 3 are longitudinal sections of the pivotal joint of Fig. 1, showing the members thereof in different relative positions; and, Fig. 4 is a longitudinal section of the improved bushing of the pivotal joint of Figs. 1 through 3 in its unstressed form.

Referring in detail to the accompanying drawing, a pivotal joint 10 is shown, which joint comprises an inner bearing member, such as a ball 11, formed on the end of a rod 12, received in a cylindrical housing 13 on a member 14, which may have a fixed position. The relationship of the rod 12 and the member 14 is that both reciprocating and oscillatory or rotational movement must be allowed therebetween. One such connection occurs in the aileron control arm in some airplanes.

The rod 12 is positioned in the housing 13 by a tubular, elastic bushing 15. Both the inner and outer faces of the bushing 15 are covered by a fabric friction material 16 which normally covers the entire surface of the bushing. Rubber 17 of suitable oil-resistant composition forms the center sleeve or core of the bushing to produce the desired elasticity or flexibility in same. The bushing 15 is adapted to retain the ball 11 therein when in operative position and to this end the bushing 15 has end portions 15a of greater wall thickness than the center section of the bushing. Fig. 4 shows that the peripheral face of the bushing is slightly concave from end to end when the bushing is unstressed. One function of such concavity is to aid in inserting, or snapping the ball 11 into the bushing 15. Furthermore, the center portion of the bushing 15 is expanded slightly when the ball 11 is positioned therein, while the ends 15a of the bushing are compressed slightly, when the bushing, with the ball 11 therein, is pressed into the housing 13. Such tension and compression aid in retaining the ball 11 within the bushing 15 and in maintaining a tight joint wherein there is no lost motion.

The bushing 15 may be manufactured by wrapping a piece of fabric of the desired size around a mandrel and applying suitably compounded rubber strips to the fabric, which may be coated with rubber cement and impregnated with a substance to increase its adhesion to rubber, to build up the desired width and thickness of rubber on the fabric. Then a second piece of fabric, which may be coated with cement and have rubber strips adjacent the longitudinal edges thereof, is applied to the rubber-fabric structure on the mandrel, with all of the rubber disposed between the fabric plies, which have edges extending beyond the rubber strips thereon. Then the fabric edges are worked and/or stitched together after which the bushing is removed from the mandrel and vulcanized to form an integral unit. Finally, the friction material on the outer surface of the bushing is impregnated with a lubricant by soaking it therein, which lubricant may be graphite suspended in a suitable liquid vehicle having no deleterious effect upon rubber. This friction material is made in accordance with the disclosure of said Patent No. 2,324,984 and has a higher kinetic friction than static.

It is seen that the tubular bushing 15 fits snugly around a large portion of the surface of the ball 11, and is snugly received in and even slightly compressed by, the housing 13. Hence there is no lost motion between the relatively movable members, as the bushing walls do not distort appreciably under the loads applied so that a force applied to one member is directly transmitted to the other to produce the desired effect thereon.

Control of the improved pivotal joint is facilitated by the fact that the kinetic friction of the material 16 is greater than its static friction. Thus there is no "breakaway" force required to initiate relative movement but the force for continuing movement must be increased after motion is started. This permits and requires an operator of the pivotal joint to apply a steady, smooth force while changing the relative position of the rod 12 and member 14.

While one embodiment of the invention is completely illustrated and described herein, it will be apparent that modification thereof can be made without departing from the scope of the invention as defined in the appended claims.

I claim:

1. A pivotal joint comprising a shaft member having a ball formed at one end thereof, a housing member having an open ended cylindrical journal surface, said housing member being adapted to receive said ball for both oscillatory and reciprocating movement therebetween, and an elastic vulcanized tubular rubber bushing, said ball being journaled in said bushing and the latter being slidably mounted for axial movement in said housing member, opposite end portions of the bushing being of larger diameter than the journal surface of the housing so as to be compressed slightly thereby, said bushing having its entire surface covered with fabric friction material impregnated with a permanent lubricant, said bushing also having a center section expanded by said ball to form a tight contact therebetween, whereby said ball can be oscillated or reciprocated with relation to said housing member without having lost motion therebetween.

2. A pivotal joint comprising a shaft member having a ball formed at one end thereof, a housing member having a cylindrical journal surface therein, said housing member being adapted to receive said ball for both oscillatory and reciprocating movement therebetween, and an elastic vulcanized rubber bushing of shorter length than said journal surface slidably mounted for axial movement therein and positioning said ball snugly in said housing member with said shaft member extending therefrom, said bushing having its entire surface covered with fabric friction material impregnated with a permanent lubricant and having the characteristic of greater kinetic friction than static friction, whereby said ball can be oscillated or reciprocated with relation to said housing member without having lost motion therebetween and with increased resistance to such motion after the start thereof.

3. An elastic bushing adapted to receive a ball member therein and to be positioned in a cylindrical housing, which bushing comprises a tubular vulcanized rubber sleeve having end areas of reduced bore diameter to aid in retaining a ball member therein after same is inserted in the bushing, and fabric lining over the inner and outer surfaces of said rubber sleeve to provide friction surfaces therefor, said fabric lining being impregnated with a lubricant, said bushing being slightly concave lengthwise on its peripheral surface.

4. A pivotal joint comprising a member formed with a ball at an end thereof, a member formed with a housing having a tubular bore constituting a journal surface therein, and an elastic bushing slidably mounted for axial movement in said bore, said ball being journaled in said bushing for oscillatory movement therein.

5. A combination as defined by claim 4 wherein the bushing is locally deformed by the ball to assure tight contact therewith, and is locally deformed by the housing to assure tight contact with the bore of the latter.

6. An elastic bushing adapted to receive a ball member therein and to be mounted in a cylindrical bore in a housing, said bushing comprising a tubular vulcanized rubber sleeve having end areas of reduced bore diameter to provide an internal socket having the shape of a spherical sector adapted to retain a ball after the same is positioned therein, said bushing being slightly concave lengthwise on its peripheral surface, whereby when said ball and said bushing are assembled in said cylindrical bore, said bushing will have zones of greater compressive stress at its ends than in its intermediate zone.

ROY W. BROWN.